(12) United States Patent
Featherstone

(10) Patent No.: US 8,894,016 B2
(45) Date of Patent: Nov. 25, 2014

(54) BIDIRECTIONAL CONTROL SURFACES FOR USE WITH HIGH SPEED VEHICLES, AND ASSOCIATED SYSTEMS AND METHODS

(71) Applicant: Blue Origin, LLC, Kent, WA (US)

(72) Inventor: Mark Featherstone, Issaquah, WA (US)

(73) Assignee: Blue Origin, LLC, Kent, WA (US)

( * ) Notice: Subject to any disclaimer, the term of this patent is extended or adjusted under 35 U.S.C. 154(b) by 0 days.

(21) Appl. No.: 14/103,742

(22) Filed: Dec. 11, 2013

(65) Prior Publication Data

US 2014/0312163 A1    Oct. 23, 2014

Related U.S. Application Data

(63) Continuation of application No. 12/712,083, filed on Feb. 24, 2010.

(60) Provisional application No. 61/187,268, filed on Jun. 15, 2009, provisional application No. 61/155,115, filed on Feb. 24, 2009.

(51) Int. Cl.
*B64G 1/62* (2006.01)
*F42B 10/06* (2006.01)

(52) U.S. Cl.
USPC ..................................... 244/158.9; 244/3.21

(58) Field of Classification Search
CPC ......... B64C 29/02; B64C 29/04; F42B 10/64; B64G 1/14; B64G 1/62
USPC ............ 244/159.1, 159.3, 159.9, 171.3, 3.21, 244/3.24, 3.27, 3.28
See application file for complete search history.

(56) References Cited

U.S. PATENT DOCUMENTS

| | | | |
|---|---|---|---|
| 2,464,827 A | 3/1949 | Noyes et al. |
| 2,807,429 A | 9/1957 | Frost et al. |
| 2,870,599 A | 1/1959 | Long |
| 3,210,025 A | 10/1965 | Lubben |
| 3,286,951 A | 11/1966 | Kendall |
| 3,295,790 A | 1/1967 | Bono et al. |
| 3,711,040 A | 1/1973 | Carver |
| 3,903,801 A | 9/1975 | Senoski |
| 3,966,142 A | 6/1976 | Corbett et al. |
| 4,896,847 A | 1/1990 | Gertsch |
| 4,964,340 A | 10/1990 | Daniels et al. |
| 5,080,306 A | 1/1992 | Porter et al. |

(Continued)

FOREIGN PATENT DOCUMENTS

DE    10058339 A1    6/2002
EP     1340316 A1    9/2003

(Continued)

OTHER PUBLICATIONS

U.S. Appl. No. 13/968,326, filed Aug. 15, 2013, Featherstone.

(Continued)

*Primary Examiner* — Brian M O'Hara
(74) *Attorney, Agent, or Firm* — Perkins Coie LLP

(57) ABSTRACT

Vehicles with bidirectional control surfaces and associated systems and methods are disclosed. In a particular embodiment, a rocket can include a plurality of bidirectional control surfaces positioned toward an aft portion of the rocket. In this embodiment, the bidirectional control surfaces can be operable to control the orientation and/or flight path of the rocket during both ascent, in a nose-first orientation, and descent, in a tail-first orientation for, e.g., a tail-down landing.

26 Claims, 4 Drawing Sheets

(56) References Cited

U.S. PATENT DOCUMENTS

| | | |
|---|---|---|
| 5,318,256 A | 6/1994 | Appleberry |
| 5,568,901 A | 10/1996 | Stiennon |
| 5,667,167 A | 9/1997 | Kistler |
| 5,678,784 A | 10/1997 | Marshall, Jr. et al. |
| 5,871,173 A | 2/1999 | Frank et al. |
| 5,873,549 A | 2/1999 | Lane et al. |
| 5,927,653 A | 7/1999 | Mueller et al. |
| 6,176,451 B1 | 1/2001 | Drymon |
| 6,193,187 B1 | 2/2001 | Scott et al. |
| 6,247,666 B1 | 6/2001 | Baker et al. |
| 6,364,252 B1 | 4/2002 | Anderman |
| 6,454,216 B1 | 9/2002 | Kiselev et al. |
| 6,666,402 B2 | 12/2003 | Rupert et al. |
| 6,817,580 B2 | 11/2004 | Smith |
| 6,926,576 B1 | 8/2005 | Alway et al. |
| 6,929,576 B2 | 8/2005 | Armstrong et al. |
| 7,344,111 B2 | 3/2008 | Janeke |
| 8,047,472 B1 | 11/2011 | Brand et al. |
| 8,408,497 B2 | 4/2013 | Boelitz et al. |
| 2006/0049316 A1 | 3/2006 | Antonenko et al. |
| 2006/0113425 A1 | 6/2006 | Rader |
| 2007/0012820 A1 | 1/2007 | Buehler |
| 2008/0078884 A1 | 4/2008 | Trabandt et al. |
| 2009/0206204 A1 | 8/2009 | Rosen |
| 2010/0320329 A1 | 12/2010 | Boelitz et al. |
| 2010/0327107 A1 | 12/2010 | Featherstone |
| 2011/0017872 A1 | 1/2011 | Bezos et al. |

FOREIGN PATENT DOCUMENTS

| | | |
|---|---|---|
| JP | 2000508601 A | 7/2000 |
| JP | 2001501151 A | 1/2001 |
| JP | 2002535193 A | 10/2002 |
| JP | 2003239698 A | 8/2003 |
| WO | WO-2009032585 A1 | 3/2009 |

OTHER PUBLICATIONS

U.S. Appl. No. 14/103,742, filed Dec. 11, 2013, Featherstone.

International Search Report and Written Opinion, International Application No. PCT/US2010/025270, Applicant: Blue Origin, LLC., mailed Apr. 12, 2010, 12 pages.

"Solid Rocket Boosters and Post Launch ; Processing," NASA Facts, National Aeronautics ; and Space Administration, John F. Kennedy ; Space Center, 2006, 8 pages.

Aerospace America, "The 787 and the ; A350 Teasing out the Facts," Publication of the American Institute of Aeronautics and Astronautics, Jun. 2009, 3 pages.

Hare, John "VTVLs as RTLS Boosters," Selenian; Boondocks, http://selenianboondocks.com/2010/06/vtvls-as-rtls-boosters/, accessed Jun. 30, 2010.

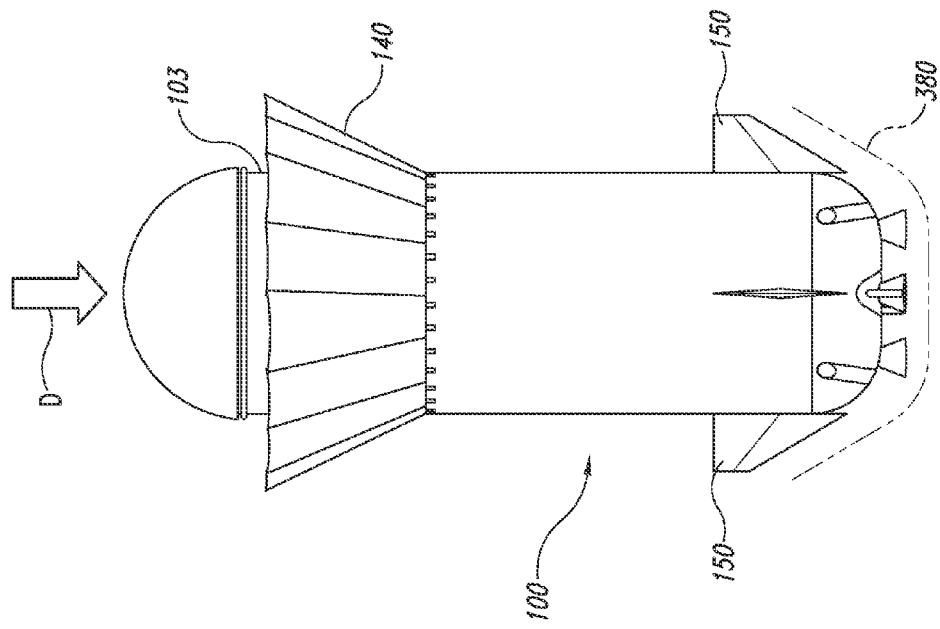
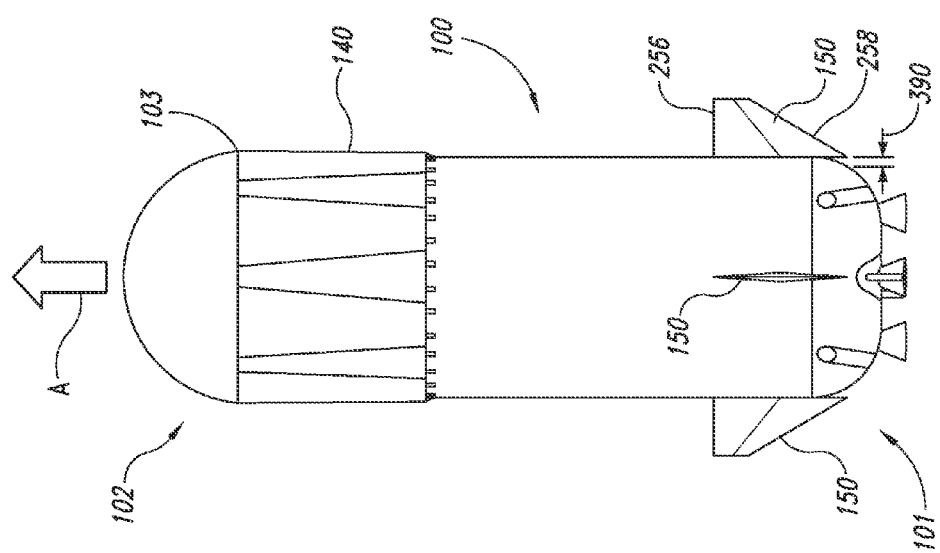

BIDIRECTIONAL CONTROL SURFACES FOR USE WITH HIGH SPEED VEHICLES, AND ASSOCIATED SYSTEMS AND METHODS

CROSS-REFERENCE TO RELATED APPLICATION(S) INCORPORATED BY REFERENCE

The present application is a continuation of U.S. patent application Ser. No. 12/712,083, filed Feb. 24, 2010, and entitled BIDIRECTIONAL CONTROL SURFACES FOR USE WITH HIGH SPEED VEHICLES, AND ASSOCIATED SYSTEMS AND METHODS, which claims priority to U.S. Provisional Patent Application No. 61/187,268, filed Jun. 15, 2009, and entitled "BIDIRECTIONAL CONTROL SURFACES FOR USE WITH HIGH SPEED VEHICLES, AND ASSOCIATED SYSTEMS AND METHODS," and which also claims priority to U.S. Provisional Patent Application No. 61/155,115, filed Feb. 24, 2009, and entitled "ROCKETS WITH DEPLOYABLE FLARE SURFACES, AND ASSOCIATED SYSTEMS AND METHODS," which are incorporated herein by reference in their entireties.

TECHNICAL FIELD

The present disclosure is directed generally to control surfaces for use with high speed vehicles, and associated systems and methods.

BACKGROUND

Rocket powered launch vehicles have been used for many years to carry humans and other payloads into space. Rockets delivered the first humans to the moon, and have launched many satellites into earth orbit, unmanned space probes, and supplies and personnel to the orbiting international space station.

Despite the rapid advances in manned and unmanned space flight, delivering astronauts, satellites, and other payloads to space continues to be an expensive proposition. One reason for this is that most conventional launch vehicles are only used once, and hence are referred to as "expendable launch vehicles" or "ELVs." The advantages of reusable launch vehicles (RLVs) include the potential of providing low cost access to space.

Although NASA's space shuttle is largely reusable, reconditioning the reusable components is a costly and time consuming process that requires extensive ground based infrastructure. Moreover, the additional shuttle systems required for reentry and landing reduce the payload capability of the shuttle. As commercial pressures increase, the need remains for lower-cost access to space. Aspects of the present disclosure are directed to addressing this challenge.

BRIEF DESCRIPTION OF THE DRAWINGS

FIGS. 3A and 3B illustrate a representative vehicle during ascent and descent, respectively, in accordance with an embodiment of the disclosure.

DETAILED DESCRIPTION

The present disclosure is directed generally to bidirectional control surfaces for use with rockets and other vehicles that can fly in both nose-first and tail-first orientations. Several details describing structures and processes that are well-known and often associated with rockets and aerodynamic control surfaces are not set forth in the following description to avoid unnecessarily obscuring embodiments of the disclosure. Moreover, although the following disclosure sets forth several embodiments, several other embodiments can have different configurations, arrangements, and/or components than those described in this section. In particular, other embodiments may have additional elements, and/or may lack one or more of the elements described below with reference to FIGS. 1A-4D.

Figure 1A:
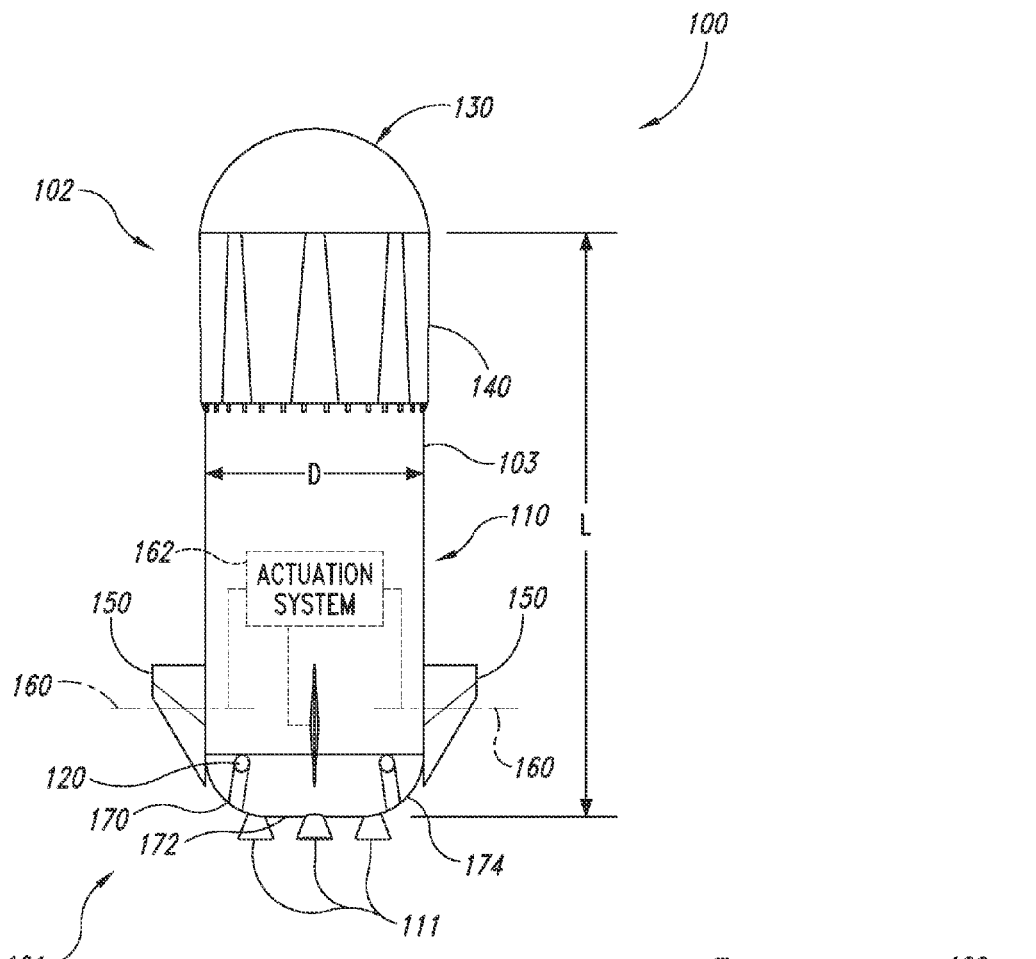
FIG. 1A is a side elevation view of a representative vehicle having bidirectional control surfaces configured in accordance with an embodiment of the disclosure.
Figure 1B:
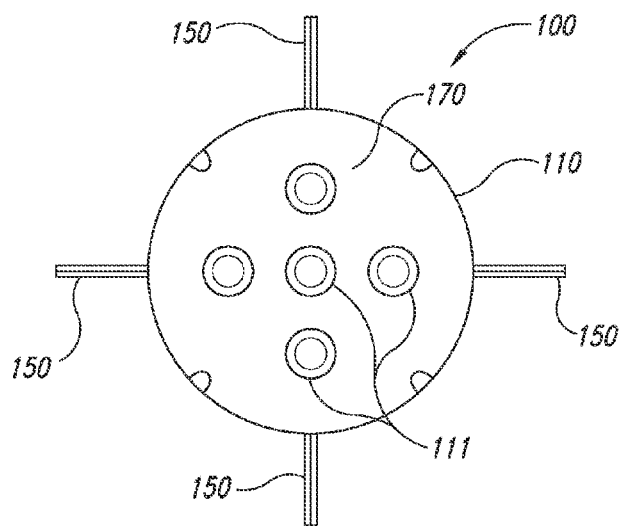
FIG. 1B is an aft end view of the vehicle of FIG. 1A.

FIG. 1A is a partially schematic, side elevation view of a vehicle 100 having a plurality of bidirectional fins 150 configured in accordance with an embodiment of the disclosure. FIG. 1B is an aft end view of the vehicle 100 shown in FIG. 1A. Referring to FIGS. 1A and 1B together, the vehicle 100 can be a rocket (e.g., an orbital or suborbital vehicle) that includes a booster or propulsion module 110 carrying a payload module 130. In one embodiment, for example, the vehicle 100 can be a reusable launch vehicle that takes advantage of the ability to fly in both a nose first and tail first direction to recover the vehicle 100 in a vertical, tail first landing. In a particular embodiment, the payload module 130 can be configured to carry cargo and/or crew. In the illustrated embodiment, the payload module 130 has a hemispherical shape. In other embodiments, however, the payload module 130 can have other shapes. In still further embodiments, the propulsion module 110 can be configured to carry additional rocket stages, such as an upper stage.

The propulsion module 110 can include one or more engines having corresponding exhaust nozzles 111 positioned toward an aft portion 101 of the vehicle 100. In a particular embodiment, the vehicle 100 includes five engines, each having a corresponding engine exhaust nozzle 111. The engines are used during the boost phase to propel the vehicle 100 upwardly during ascent. Optionally, some or all of the engine nozzles 111 can pivot to provide thrust vectoring to steer the vehicle 100 during ascent, either alone or in combination with other control systems including other aerodynamic control systems.

The vehicle 100 can additionally include a deployable aerodynamic surface or surfaces, such as a deployable flare 140, positioned toward a forward portion 102 of the vehicle 100. The deployable flare 140 can be stowed during ascent and deployed during descent to stabilize and/or slow the vehicle 100 during a tail down descent and landing. In various embodiments, the vehicle 100 can include deployable flare systems as described in U.S. Provisional Patent Application No. 61/155,115, filed Feb. 24, 2009, and entitled "ROCKETS WITH DEPLOYABLE FLARE SURFACES, AND ASSOCIATED SYSTEMS AND METHODS;" and U.S. Non-provisional patent application Ser. No. 12/712,156, now U.S. Pat. No. 8,408,497, filed Feb. 24, 2010, and entitled "LAUNCH VEHICLES WITH FIXED AND DEPLOYABLE DECELERATION SURFACES, AND/OR SHAPED FUEL TANKS, AND ASSOCIATED SYSTEMS AND METHODS," both of which are incorporated herein in their entireties by reference. In the illustrated embodiment, the vehicle 100 can further include a deployable landing gear 120 (showed stowed in FIGS. 1A and 1B) positioned to allow the vehicle 100 to land in a tail first or tail down orientation.

Although only illustrative of particular embodiments, the propulsion module 110 can have a length L of from about 10 feet to about 50 feet, such as from about 20 feet to about 40 feet, or about 33 feet. The propulsion module 110 can also include a cylindrical or circular cross-section having a diameter D of from about five feet to about 20 feet, or from about eight feet to about 15 feet, or about 13 feet. In other embodiments, the vehicle 100 can have other shapes, sizes and overall dimensions without departing from the present disclosure.

In a particular embodiment, the aft portion 101 of the vehicle 100 includes an aft surface 170. In the illustrated embodiment, the aft surface 170 includes a base region 172 in the proximity of the nozzles 111, and a transition region 174. The transition region 174 transitions between the base region 172 and an exterior surface 103 of the propulsion module 110. In a particular embodiment, the base region 172 can be flat, or at least generally flat, and the transition region 174 can be curved. For example, in a particular embodiment the transition region 174 can have a radius of from about 20 inches to about 50 inches, or about 40 inches. In other embodiments, the base region 172 and/or the transition region 174 can have other shapes, sizes, and/or dimensions.

In one aspect of this embodiment, the bidirectional fins 150 are positioned toward the aft portion 101 of the propulsion module 110. In the illustrated embodiment, the vehicle 100 includes four fins 150 equally spaced around the propulsion module 110, and each of the fins 150 is substantially identical, or at least generally similar in structure and function. In other embodiments, however, the vehicle 100 can include more or fewer fins positioned at different locations around the propulsion module 110, and one or more of the fins can be different in structure and/or function.

As described in greater detail below, the bidirectional fins 150 can be used for vehicle guidance and control during both ascent in a nose-first direction or orientation, and descent in a tail-first direction. In this regard, the fins 150 can be operationally coupled to a control system 162. The control system 162 can include one or more processors, circuits, and/or mechanisms configured to rotate or pivot the fins back and forth about a pivot axis or hinge line 160 in response to control signals received from an on-board guidance system, a remote guidance system, and/or computer-readable media. As described in greater detail below, the bidirectional fins 150 can pivot together in the same direction, at the same rate, and/or to the same angle of attack ("a"); or independently (e.g., differentially) with respect to each other in different directions, rates, and/or different angles of attack, as required to provide the desired vehicle trajectory during ascent and/or descent. In a particular embodiment, the fins 150 can operate between angles of +/−30 degrees. In other embodiments, the fins 150 can pivot to other angles. Further aspects of the fins 150 are described in greater detail below.

Figure 2C:
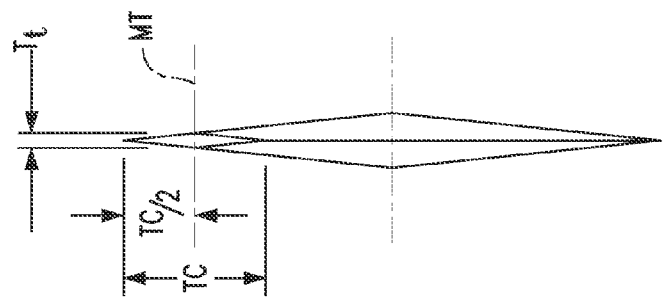
FIGS. 2A-2C are a plan view, inboard end view, and an outboard end view, respectively, of a bidirectional control surface configured in accordance with an embodiment of the disclosure.
Figure 2B:
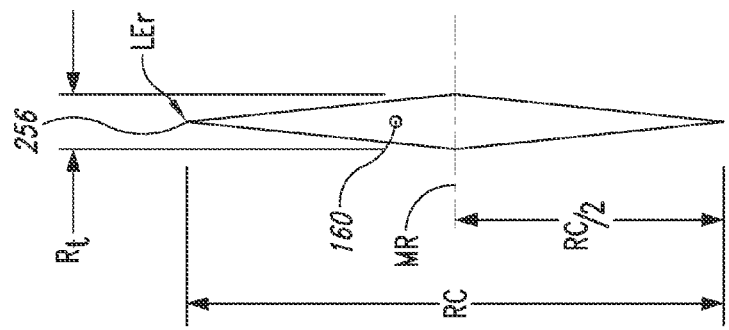
Figure 2A:
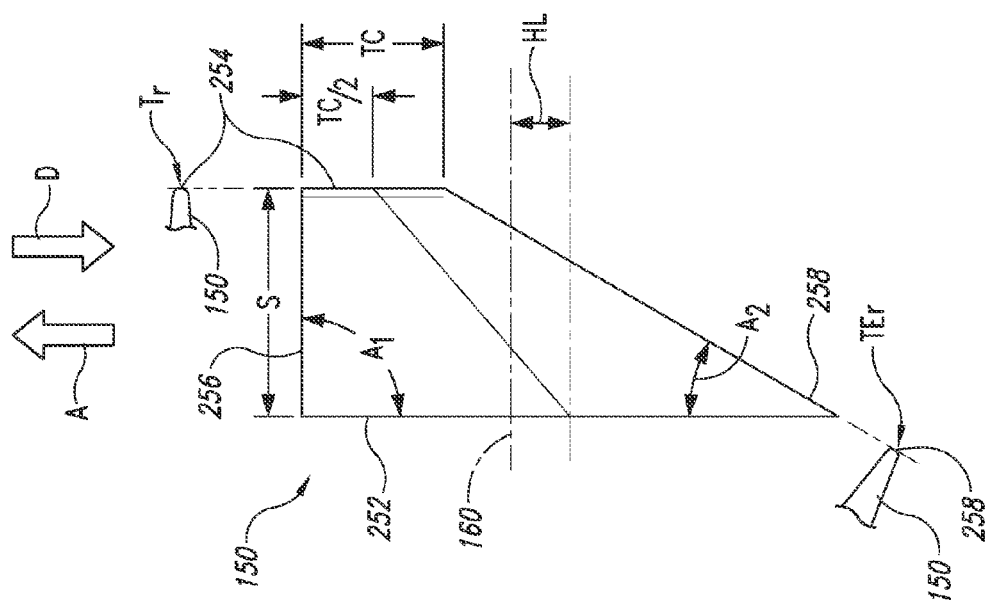

FIG. 2A is a planform or side elevation view of the fin 150 configured in accordance with an embodiment of the disclosure. FIG. 2B is an inboard end view of the fin 150, and FIG. 2C is an outboard end view of the fin 150. Referring to FIGS. 2A-2C together, the fin 150 includes a tip 254 spaced apart from a root 252. In one aspect of this embodiment, the fin 150 has a relatively low aspect ratio ("AR"). For example, the fin 150 can have a span S of from about 15 inches to about 45 inches, or about 30 inches. The root 252 can have a root chord RC of from about 60 inches to about 110 inches, or about 83 inches, and the tip 254 can have a tip chord TC of from about 10 inches to about 30 inches, or about 20 inches. As those of ordinary skill in the art will appreciate, the foregoing dimensions are merely representative of certain embodiments of the disclosure. The present disclosure is not limited to these dimensions, and other embodiments can have other dimensions without departing from the present disclosure.

In another aspect of this embodiment, the fin 150 includes a first or forward edge 256 having relatively little sweep, or no sweep, as defined by a first sweep angle A1 of from about 85 degrees to about 95 degrees, or about 90 degrees. The fin 150 can further include a second or aft edge 258 having a relatively high sweep as defined by a second sweep angle A2 of from about 15 degrees to about 40 degrees, or about 29 degrees. In other embodiments, the forward edge 256 and/or the aft edge 258 can have other sweep angles. As used herein, in this particular embodiment the term "forward edge" refers to the edge positioned toward the forward portion 102 of the vehicle, and the term "aft edge" refers to the edge positioned toward the aft portion 101 of the vehicle.

In a particular embodiment, the fin 150 has a symmetrical, or an at least approximately symmetrical airfoil cross-section. More specifically, in the illustrated embodiment the fin 150 has a flat-sided, diamond-shaped cross-section in which the root 252 has a maximum thickness Rt occurring at, or at least proximate to, a midpoint MR of the root chord RC. Similarly, the tip 254 has a maximum thickness Tt occurring at, or at least proximate to, the midpoint MT of the tip chord TC. In a particular embodiment, the maximum thickness Rt at the root chord RC can be from about 6 inches to about 13 inches, or about 9 inches, and the maximum thickness Tt at the tip chord TC can be from about 1 inch to about 4 inches, or about 2.2 inches. In other embodiments, the fin 150 can have other symmetric or non-symmetric cross-sections, as well as other maximum chord thicknesses at the root and/or the tip.

As shown in FIG. 2A, the hinge line 160 is positioned between the midpoint MR of the root 252 and the forward edge 256, and is offset from the midpoint a distance HL. In the illustrated embodiment, the distance HL can be from about 3 inches to about 18 inches, or about 8 inches. In other embodiments, the hinge line 160 can have other positions relative to the forward edge 256, the aft edge 258, and/or the midpoint MR of the root 252.

In a further aspect of this embodiment, the forward edge 256 can have a radius LEr of from about 0.1 inch to about 1 inch, or about 0.25 inch, and the aft edge 258 can have a radius TEr of from about 0.1 inch to about 1 inch, or about 0.25 inch. In addition, the tip 254 can have a radius Tr of from about 0.1 inch to about 2 inches, or from about 1 inch at the midpoint MT to about 0.25 inch at the forward edge 256 and about 0.25 inch at the aft edge 258. Making the tip portion of the fin 150 rounded instead of flat can provide gentler stall characteristics. In other embodiments, however, the forward edge 256, the aft edge 258, and/or the tip 254 can have other shapes, sizes, radiuses and/or other dimensions. For example, in a particular embodiment the tip 254 can be flat or at least approximately flat.

In particular embodiments, the fin 150 can be manufactured from suitable materials known in the art, including, for example, suitable metallic materials such as aluminum, titanium, and/or steel. In other embodiments, the fins 150 and/or portions thereof can be manufactured from suitable composite materials, including graphite/epoxy materials and/or other suitable fiber-reinforced resin materials. Such composite structures can include, for example, composite sandwich structures having a suitable core material covered by a laminated facesheet of composite laminates. In further embodiments, the outer surfaces of all or a portion of the fins 150 can include suitable layers and/or coatings (e.g., ablative coatings) for dealing with the potentially high temperatures experienced during ascent and/or descent of the vehicle 100 (FIG. 1A).

As discussed above, the fin 150 can be implemented to provide guidance and control on a vehicle (e.g., a rocket) that flies in a first direction (e.g., nose first or forward) during ascent and a second direction (e.g., tail first or aft-first) during descent. One feature of the fin 150 is that when the vehicle is flying in an ascent direction, as indicated by arrow A, the fin 150 provides a relatively high change in lift force as the angle of attack (α) of the fin 150 changes. Put another way, the fin 150 demonstrates a relatively high lift slope during ascent, with lift stall occurring at an angle of attack α of from about 8 degrees to about 13 degrees, or at about 10 degrees or more. As used herein, the term "lift slope" refers to the slope of a curve describing the lift, or more specifically the coefficient of lift $C_u$ of the fin 150 as a function of angle of attack, α. When the vehicle is flying in a descent direction, however, as indicated by arrow D, the fin 150 demonstrates a relatively low lift slope with a peak lift coefficient $C_L$ of at least about 1. Moreover, during descent the fin 150 of this embodiment stalls at angles of attack α greater than about 12 degrees to about 18 degrees, or greater than about 15 degrees. Accordingly, for reasons discussed in more detail below, in the illustrated embodiment the fins 150 are configured to provide a relatively aggressive lift curve during ascent in a nose first direction, and a relatively gradual lift curve, with a relatively high lift peak, during descent in a tail first direction.

In another aspect of the illustrated embodiment, the fin 150 maintains a center of pressure location during all phases of flight that is relatively close to the actuator hinge line 160. This minimizes or at least reduces the torques required to pivot the fin 150 relative to its neutral state and achieve the desired angles of attack. A further aspect of the fin 150 is that it is configured to operate in a flight regime or envelope including both subsonic and supersonic flight, including supersonic flight at a mach number of about four.

As mentioned above, in a particular embodiment the fin 150 can have a symmetrical, or an at least approximately symmetrical airfoil shape (e.g., a diamond-shape or a "double wedge" supersonic airfoil shape). A symmetric airfoil can facilitate predictable behavior during bidirectional flight, and results in the maximum thickness Rt of the root 252 being positioned relatively close to the pivot axis or hinge line 160.

During ascent in the direction of arrow A, the forward edge 256 is the "leading edge" and the planform of the fin 150 represents a relatively low aspect ratio AR lifting surface having a non-swept (or very low sweep) leading edge. In this particular embodiment, this planform creates a moderate to high lift curve slope with stall occurring beyond a desired angle of attack, such as about 10 degrees. During descent in the direction of the arrow D, the aft edge 258 becomes the "leading edge," and the planform represents a relatively low aspect ratio AR lifting surface having a leading edge that is highly swept at an angle of, e.g., about 60 degrees relative to the airflow. During descent, this highly swept, low aspect ratio AR planform can provide a relatively low lift curve slope with maximum lift occurring at relatively high angles of attack across the entire flight regime. Moreover, during descent this fin planform can provide a lift stall that occurs at angles of attack of about 20 degrees at subsonic speeds, and at more than about 45 degrees at supersonic speeds. During descent, the maximum coefficient of lift can be at least about 1.0 (for subsonic flight) with peak coefficient of lift values closer to about 1.5 during supersonic flight.

A further aspect of the illustrated fin planform is that during both ascent and descent, the center of pressure location is relatively well bounded throughout the range of angles of attack. This can minimize or at least reduce the torque required to control the fin 150. Moreover, with this fin planform many of the aerodynamic conditions that result in relatively high stresses occur when the center of pressure is very close to the hinge line 160. Although the center of pressure position can, in some embodiments, vary to a greater degree, this is expected to occur during fin maneuvers and/or aerodynamic conditions that result in relatively low stresses.

FIG. 3A is a partially schematic, side elevation view of an embodiment of the vehicle 100 during its ascent, as indicated by arrow A. During the ascent or boost phase, the deployable flare 140 is stowed and is accordingly positioned flat against and/or flush with the external surface 103 of the vehicle 100. Moreover, during the ascent phase the landing gear 120 (FIGS. 1A and 1B) can be stowed.

During boost phase, the fins 150 provide a stabilizing effect as they tend to move the center of pressure aft of the vehicle center of gravity. In certain embodiments, the degree of stabilization provided by the fins 150 can be directly proportional to the curve of the lift slope of the fins and, accordingly, the higher the lift slope the greater the degree of stabilization. In certain embodiments, the magnitude of the lift generated by the fins 150 may not be as important as the slope of the lift curve or the need for the lift curve to remain linear, or at least approximately linear, over the operational angle of attack range. As mentioned above, the fins 150 can also pivot to help actively guide and control the vehicle during ascent.

FIG. 3B illustrates the vehicle 100 during its descent phase, as indicated by arrow D. During descent, the deployable flare 140 can be deployed by, for example, pivoting the flare 140 so that it expands outwardly from the external surface 103. As discussed above, this configuration is expected to slow and help stabilize the vehicle 100 during descent. For example, by deploying the flare 140 the center of pressure acting on the vehicle 100 can shift upwardly (e.g., above the vehicle center of gravity) so that gravitational forces acting on the vehicle 100 tend to stabilize perturbations that may be caused by aerodynamic forces acting on the vehicle 100.

During descent of the vehicle 100, the engines are off and no longer thrusting in most, if not all embodiments. In certain embodiments, the engines will remain off and non-thrusting until just prior to touch down of the vehicle 100 in a tail-first orientation at the landing site. As a result, the fins 150 are the dominant aerodynamic control surfaces and the only means, or at least the predominant means, for steering the vehicle 100 during descent.

During descent, the fins 150 are positioned towards the direction of flight and can thus destabilize the vehicle. In certain embodiments, however, having a relatively gentle lift curve can minimize, or at least reduce, the aerodynamic destabilization effect of the fins 150 during descent. However, because the fins 150 are used for vehicle guidance and control during descent, it is also desirable for the fins 150 to be able to provide sufficiently high levels of peak lift. This peak lift will enable the fins 150 to orient the vehicle to relatively large angles of attack when needed during descent.

In another aspect of the illustrated embodiment, the fins 150 are located relatively far aft on the vehicle 100. This can maximize, or at least increase, the ability of the fins 150 to stabilize the vehicle 100 during ascent and control the vehicle 100 during descent. As discussed above with reference to FIGS. 1A and 1B, the aft surface 170 of the vehicle 100 can be rounded in the transition region 174 between the relatively flat base region 172 and the external surface 103 of the propulsion module 110. As a result, moving the fins 150 aft produces a slight overhang gap 390 between the inboard tip of the aft edge 258 (FIG. 2A) and the transition region 174 of the aft surface 170. It is expected, however, that the overhang gap 390 will not negatively affect operation of the fins 150 over the flight regime and mission, including both forward travel during ascent and aft travel during descent.

During descent, the fins 150 are positioned sufficiently behind a bow shock 380. The relatively flat base region 172 of the aft surface 170 tends to move the bow shock 380 outwardly in front of the aft surface 170 during descent of the vehicle 100. As a result, the fins 150 are positioned generally aft or behind the bow shock 380, which can avoid or at least reduce shocks and other high loads on the fins 150 during descent.

There are various aspects of the fin design that are expected to provide favorable characteristics for use with a reusable launch vehicle that can ascend in a nose-first direction and descend in a tail-first direction. For example, the fins 150 are relatively small and, as a result, remain positioned behind the bow shock 380 during both descent and ascent. As discussed above, this can prevent or at least reduce the likelihood that shocks will directly impinge on the fin surface and create high local loads or unsteady, buffeting loads during flight. The relatively short fin span S (FIG. 2A) also facilitates working around the vehicle and performing ground maneuvers such as vehicle lifting, rotation, and/or transportation with conventional on-site equipment.

Figure 4A:
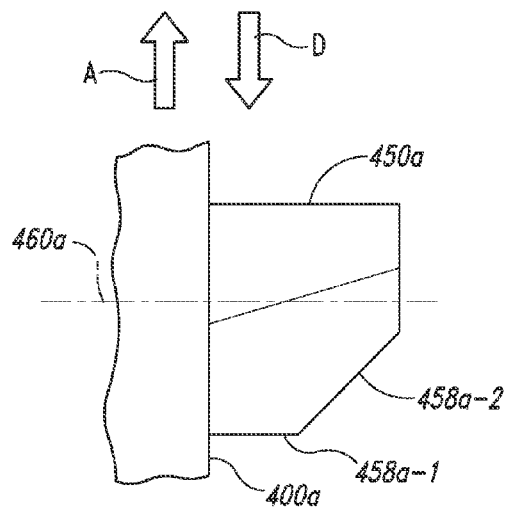
FIGS. 4A-4D are plan views of bidirectional control surfaces configured in accordance with other embodiments of the disclosure.

FIGS. 4A-4D are a series of side elevation views of portions of launch vehicles 400a-d having bidirectional control surfaces or fins 450a-d configured in accordance with other embodiments of the disclosure. Referring first to FIG. 4A, the fin 450a is at least generally similar in structure and function to the fin 150 described in detail above. However, in the illustrated embodiment the fin 450a includes an aft edge 458 having a non-swept inboard portion 458a-1 and a highly swept outboard portion 458a-2 (e.g., an outer one-half portion). In one aspect of this embodiment, having the aft edge 458 with a straight inboard portion 458a-1 and a highly swept outboard portion 458a-2 may result in a fin with earlier stall characteristics than the fin 150 described in detail above.

Figure 4B:
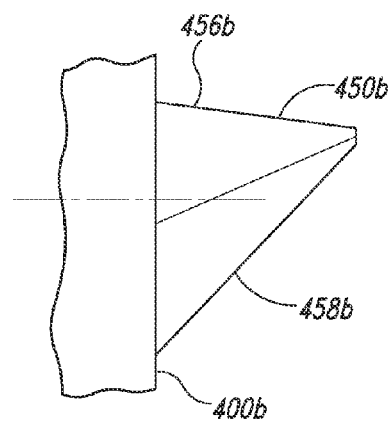
Figure 4C:
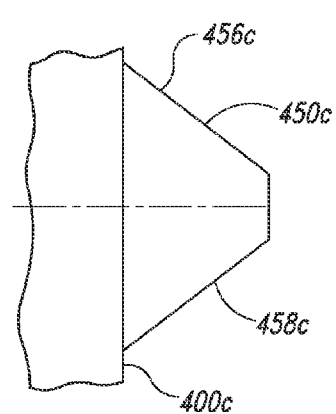
Figure 4D:
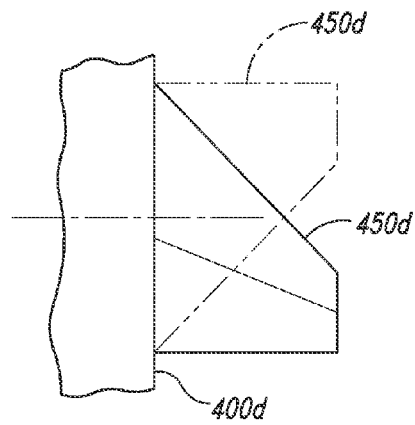

FIG. 4B illustrates a fin 450b having a relatively low or moderately swept forward edge 456b and a relatively highly swept aft edge 458b. Referring next to FIG. 4C, the fin 450c has a symmetrical, or an at least approximately symmetrical planform in which both a forward edge 456c and an aft edge 458c are moderately to highly swept. Referring next to FIG. 4D, in this embodiment the fin 450d has a highly swept forward edge 456d and a non-swept or relatively low sweep aft edge 458d. In this particular embodiment, however, the fin 450d can rotate a full 360 degrees about a hinge line 460d to that the planform can be optimized for the direction of flight. For example, in a particular embodiment the fin 450d can be oriented as shown by the solid line in FIG. 4D for ascent, and then rotated 180 degrees about the hinge line 460d to the position shown by the dotted line in FIG. 4D for descent. Although the fins illustrated in FIGS. 4A and 4D can have symmetrical cross-sections (e.g., diamond-shaped cross-sections), in other embodiments these fin configurations and variations thereof can have non-symmetrical cross-sections.

From the foregoing, it will be appreciated that specific embodiments of the disclosure have been described herein for purposes of illustration, but that the disclosure may include other embodiments as well. For example, the bidirectional control surfaces 150 can have other shapes and/or arrangements that are different than those shown and described above depending on the type of rocket, mission, etc. Certain aspects of the disclosure described in the context of particular embodiments may be combined or eliminated in other embodiments. Further, while advantages associated with certain embodiments have been described in the context of those embodiments, other embodiments may also exhibit such advantages and not all embodiments need necessarily exhibit such advantages to fall within the scope of the invention. Accordingly, the invention is not limited, except as by the appended claims.

I claim:

1. A rocket comprising:
   a first end portion;
   a second end portion;
   one or more bidirectional aerodynamic control surfaces, wherein each of the one or more aerodynamic control surfaces spans between a root portion and a distal tip portion; and
   a control system configured to pivot each of the one or more aerodynamic control surfaces about a pivot axis extending from the root portion toward the tip portion to steer the rocket when the rocket is flying in a first orientation in which the first end portion leads the second end portion, and to steer the rocket when the rocket is flying in a second orientation in which the second end portion leads the first end portion.

2. The rocket of claim 1, wherein the rocket includes one or more engines and associated exhaust nozzles positioned toward the second end portion of the rocket, and wherein the one or more aerodynamic control surfaces are positioned toward the second end portion of the rocket.

3. The rocket of claim 1 wherein each of the one or more aerodynamic control surfaces has a low-sweep or non-swept forward edge and a highly swept aft edge when the rocket is in the first orientation.

4. The rocket of claim 1, wherein the rocket includes one or more engines and associated exhaust nozzles positioned toward the second end portion of the rocket, and wherein each of the one or more aerodynamic control surfaces is positioned toward the second end portion of the rocket and includes a forward edge positioned away from the second end portion and an aft edge positioned toward the second end portion, wherein the forward edge has a first sweep angle and the aft edge has a second sweep angle that is greater than the first sweep angle.

5. The rocket of claim 1, wherein
   the pivot axis is spaced apart from a first edge portion of the control surface and a second edge portion of the control surface.

6. The rocket of claim 5, wherein the pivot axis is positioned between a midpoint of the root portion and the first edge portion.

7. The rocket of claim 1, wherein the first orientation is an ascent orientation, and wherein the second orientation is a descent orientation.

8. The rocket of claim 1 wherein each of the one or more aerodynamic control surfaces exhibits a first lift slope when the rocket is flying in the first orientation, and wherein each of the one or more aerodynamic control surfaces exhibits a second lift slope that is different from the first lift slope when the rocket is flying in the second orientation.

9. The rocket of claim 1, further comprising:
   a payload module positioned toward the first end portion; and
   a booster module positioned toward the second end portion, wherein each of the one or more aerodynamic control surfaces is movably attached to the booster module.

10. A rocket for transporting at least one of humans and cargo into space, the rocket comprising:
 a first end portion;
 a second end portion; and
 a plurality of movable bidirectional control surfaces that steer the rocket when the rocket is flying in a first orientation in which the first end portion leads the second end portion, and when the rocket is flying in a second orientation in which the second end portion leads the first end portion, wherein each of the bidirectional control surfaces includes:
  a root portion;
  a distal tip portion spaced apart from the root portion;
  a first edge portion extending between the root portion and the tip portion; and
  a second edge portion extending between the root portion and the tip portion, wherein a chord extends between the first edge portion and the second edge portion;
  wherein the first edge portion leads the second edge portion when the rocket is flying in the first orientation.

11. The rocket of claim 10 wherein each of the bidirectional control surfaces exhibits a first lift slope when the rocket is flying in the first orientation, and wherein each of the bidirectional control surfaces exhibits a second lift slope that is more gradual than the first lift slope when the rocket is flying in the second orientation.

12. The rocket of claim 10 wherein the bidirectional control surfaces are positioned closer to the second end portion than the first end portion, and wherein the rocket further comprises one or more rocket exhaust nozzles positioned proximate the second end portion.

13. The rocket of claim 10, wherein the bidirectional control surfaces are configured to pivot about individual axes to steer the rocket when the rocket is flying in the first orientation and when the rocket is flying in the second orientation.

14. The rocket of claim 10, wherein each of the bidirectional control surfaces has a diamond-shaped cross-section.

15. The rocket of claim 10, further comprising one or more rocket exhaust nozzles positioned toward the second end portion, wherein the first edge portions of the bidirectional control surfaces face generally away from the second end portion and the second edge portions of the bidirectional control surfaces face generally away from the first end portion, wherein each of the bidirectional control surfaces is configured to rotate about a corresponding pivot axis, and wherein the pivot axis is positioned between a midpoint of the root portion and the first edge portion.

16. The rocket of claim 10, further comprising one or more rocket exhaust nozzles positioned toward the second end portion, wherein the first edge portions of the bidirectional control surfaces face generally away from the second end portion and the second edge portions of the bidirectional control surfaces face generally away from the first end portion, and wherein the first edge portions have a first sweep angle and the second edge portions have a second sweep angle that is greater than the first sweep angle.

17. The rocket of claim 10, further comprising:
 a payload module positioned toward the first end portion; and
 a booster module positioned toward the second end portion, wherein the plurality of bidirectional control surfaces are attached to the booster module.

18. The rocket of claim 10, further comprising one or more rocket exhaust nozzles positioned toward the second end portion, wherein the first edge portions of the bidirectional control surfaces face generally away from the second end portion and the second edge portions of the bidirectional control surfaces face generally away from the first end portion, and wherein the first edge portions have a first sweep angle and the second edge portions have a second sweep angle that is different from the first sweep angle.

19. The rocket of claim 10 wherein each bidirectional control surface further includes a pivot axis positioned between a midpoint of the root portion and the first edge portion, and wherein each of the bidirectional control surfaces is configured to rotate back and forth about its corresponding pivot axis to steer the rocket when the rocket is flying in the first orientation and when the rocket is flying in the second orientation.

20. The rocket of claim 10 wherein the second edge portion leads the first edge portion when the rocket is flying in the second orientation.

21. A space launch vehicle having a nose portion spaced apart from a tail portion, the vehicle comprising:
 a rocket exhaust nozzle;
 a plurality of fins extending outwardly from the vehicle, each of the plurality of fins having a first edge portion closer to the nose portion than the tail portion, a second edge portion closer to the tail portion than the nose portion, and an axis extending between the first and second edge portions; and
 a control system configured to pivot each fin about each fin's respective axis to provide active aerodynamic control of the vehicle when the vehicle is in nose-first airflow and when the vehicle is in tail-first airflow.

22. The space launch vehicle of claim 21, wherein when the vehicle is in nose-first airflow, the vehicle is in an ascent orientation, and wherein when the vehicle is in tail-first airflow, the vehicle is in a descent orientation.

23. The space launch vehicle of claim 21, further comprising:
 a payload module positioned toward the nose portion; and
 a propulsion module positioned toward the tail portion, wherein the plurality of fins is attached to the propulsion module.

24. The space launch vehicle of claim 21, wherein the rocket exhaust nozzle is positioned proximate the tail portion.

25. The space launch vehicle of claim 21, wherein each of the plurality of fins exhibits a first lift slope when the vehicle is in nose-first airflow, and wherein each of the plurality of fins exhibits a second lift slope that is different from the first lift slope when the vehicle is in tail-first airflow.

26. The space launch vehicle of claim 21, wherein the control system has one or more circuits configured to pivot each of the plurality of fins independently with respect to each other.

* * * * *